United States Patent
Heron et al.

(10) Patent No.: US 9,672,501 B2
(45) Date of Patent: *Jun. 6, 2017

(54) IN-VEHICLE SERVICES FOR USER-PROVIDED DEVICES

(71) Applicant: Kwivo, LLC., New York, NY (US)

(72) Inventors: Alexandra Kathleen Heron, New York, NY (US); Julio Toro Silva, Panamá (PA); Manimeldura Janaka Mendis, Sar (BH)

(73) Assignee: Kwivo, LLC, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/636,121

(22) Filed: Mar. 2, 2015

(65) Prior Publication Data

US 2015/0170121 A1   Jun. 18, 2015

Related U.S. Application Data

(63) Continuation of application No. 13/843,864, filed on Mar. 15, 2013, now Pat. No. 8,972,598.

(51) Int. Cl.
  *G06Q 20/12* (2012.01)
  *G06Q 30/06* (2012.01)
  *H04L 29/08* (2006.01)
  *H04L 29/06* (2006.01)

(52) U.S. Cl.
  CPC ....... *G06Q 20/123* (2013.01); *G06Q 30/0641* (2013.01); *H04L 67/12* (2013.01); *H04L 67/42* (2013.01)

(58) Field of Classification Search
  CPC combination set(s) only.
  See application file for complete search history.

(56) References Cited

U.S. PATENT DOCUMENTS

| | | | |
|---|---|---|---|
| 4,352,200 A | 9/1982 | Oxman | 455/41 |
| 5,006,985 A | 4/1991 | Ehret et al. | 364/413.01 |
| 5,880,867 A | 3/1999 | Ronald | 359/152 |

(Continued)

OTHER PUBLICATIONS

Liu et al., "Toward Next-Generation In-Flight Entertainment Systems: A Survey of the State of the Art and Possible Extensions", Advances in Semantic Media Adaptation and Personalization, 2008, pp. 95-111 (9 pages).

(Continued)

*Primary Examiner* — Abdullahi E Salad
(74) *Attorney, Agent, or Firm* — Sheppard Mullin Richter & Hampton LLP

(57) ABSTRACT

An approach to facilitating in-vehicle services for user-provided devices is provided. One or more communication sessions with one or more user-provided devices may be facilitated by an in-vehicle computer system. One or more content items available to the one or more user-provided devices may be stored by the in-vehicle computer system. A list of the one or more content items may be provided by the in-vehicle computer system to the one or more user-provided devices. A selection of at least one content item from at least one user-provided device may be received by the in-vehicle computer system. Access to the at least one content item may be provided, by the in-vehicle computer system via the one or more communication sessions, to the at least one user-provided device based on the selection.

18 Claims, 6 Drawing Sheets

(56) References Cited

U.S. PATENT DOCUMENTS

| | | | |
|---|---|---|---|
| 5,959,596 A | 9/1999 | McCarten et al. .................. 345/2 |
| 6,094,640 A | 7/2000 | Goheen ............................. 705/5 |
| 6,499,027 B1 | 12/2002 | Weinberger ....................... 707/4 |
| 6,509,829 B1 | 1/2003 | Tuttle ............................ 340/10.1 |
| 6,559,812 B1 | 5/2003 | McCarten et al. ............... 345/2.1 |
| 6,810,527 B1 | 10/2004 | Conrad et al. .................... 725/76 |
| 6,957,772 B1 | 10/2005 | Green et al. .................... 235/384 |
| 6,973,479 B2 | 12/2005 | Brady, Jr. et al. ............ 709/203 |
| 7,177,638 B2 | 2/2007 | Funderburk et al. .......... 455/431 |
| 7,280,825 B2 | 10/2007 | Keen et al. .................... 455/431 |
| 7,313,476 B2 | 12/2007 | Nichols et al. ................ 701/213 |
| 7,675,849 B2 | 3/2010 | Watson et al. ................. 370/217 |
| 7,725,569 B2 | 5/2010 | Brady, Jr. et al. ............ 709/223 |
| 7,945,934 B2 | 5/2011 | Margis et al. .................... 725/75 |
| 7,984,190 B2 | 7/2011 | Rhoads ......................... 709/248 |
| 8,037,500 B2 | 10/2011 | Margis et al. .................... 725/75 |
| 8,103,211 B1 | 1/2012 | Fujisaki ....................... 455/3.06 |
| 8,180,678 B2 | 5/2012 | Brotherston ...................... 705/22 |
| 8,283,801 B2 | 10/2012 | Petitpierre ...................... 307/9.1 |
| 8,315,762 B2 | 11/2012 | Correa et al. ..................... 701/36 |
| 8,322,723 B1 | 12/2012 | Bancel et al. ................. 273/274 |
| 8,328,094 B2 | 12/2012 | Proud et al. ................... 235/383 |
| 8,488,522 B2 | 7/2013 | Falchuk et al. ............... 370/328 |
| 8,719,064 B1 | 5/2014 | Heron et al. ....................... 705/6 |
| 8,744,926 B1 | 6/2014 | Heron et al. ............... 705/26.41 |
| 8,751,646 B1 | 6/2014 | Heron et al. ................... 709/224 |
| 8,972,598 B2 | 3/2015 | Heron et al. ................... 709/231 |
| 9,203,721 B2 | 12/2015 | Heron et al. |
| 9,577,907 B2 | 2/2017 | Heron |
| 2002/0010633 A1 | 1/2002 | Brotherston ...................... 705/26 |
| 2002/0059614 A1 | 5/2002 | Lipsanen et al. ................. 725/75 |
| 2002/0100803 A1 | 8/2002 | Sehr ............................... 235/384 |
| 2002/0107916 A1 | 8/2002 | Nii et al. ........................ 709/203 |
| 2002/0109647 A1 | 8/2002 | Crandall et al. ............... 345/2.1 |
| 2002/0170060 A1 | 11/2002 | Lyman ............................. 725/73 |
| 2003/0046438 A1 | 3/2003 | O'Donnell ...................... 709/250 |
| 2003/0046701 A1 | 3/2003 | O'Donnell ........................ 725/76 |
| 2003/0084451 A1 | 5/2003 | Pierzga et al. .................. 725/47 |
| 2003/0093798 A1 | 5/2003 | Rogerson ........................ 725/75 |
| 2003/0208579 A1 | 11/2003 | Brady, Jr. et al. ............ 709/223 |
| 2004/0039617 A1 | 2/2004 | Maycotte et al. .................. 705/5 |
| 2005/0056696 A1 | 3/2005 | Green et al. .................... 235/384 |
| 2005/0091086 A1 | 4/2005 | Moore ............................... 705/5 |
| 2005/0132407 A1* | 6/2005 | Boyer et al. ..................... 725/77 |
| 2006/0010438 A1 | 1/2006 | Brady, Jr. et al. ............ 717/174 |
| 2006/0040612 A1 | 2/2006 | Min ............................... 455/12.1 |
| 2006/0055532 A1 | 3/2006 | Li ............................ 340/539.32 |
| 2006/0109107 A1 | 5/2006 | Staton et al. ............ 340/539.13 |
| 2006/0163868 A1 | 7/2006 | Baumann |
| 2007/0097893 A1* | 5/2007 | Rodriguez et al. ........... 370/310 |
| 2007/0168205 A1 | 7/2007 | Carlson et al. ................... 705/1 |
| 2008/0121757 A1 | 5/2008 | Pozzi et al. ................. 244/118.6 |
| 2008/0132212 A1 | 6/2008 | Lemond et al. ........... 455/414.1 |
| 2008/0133705 A1 | 6/2008 | Lemond et al. ............... 709/217 |
| 2008/0141314 A1 | 6/2008 | Lemond et al. ................. 725/76 |
| 2008/0141315 A1 | 6/2008 | Ogilvie ........................... 725/77 |
| 2008/0219154 A1 | 9/2008 | Durrey et al. ................. 370/225 |
| 2008/0221753 A1 | 9/2008 | Kellner et al. .................. 701/36 |
| 2008/0270686 A1 | 10/2008 | Grannan et al. ............... 711/113 |
| 2009/0094635 A1 | 4/2009 | Aslin et al. ..................... 725/32 |
| 2009/0112377 A1 | 4/2009 | Schalla et al. ..................... 701/3 |
| 2009/0133112 A1 | 5/2009 | Kauffman et al. ............... 726/11 |
| 2009/0187640 A1 | 7/2009 | Delia et al. .................... 709/219 |
| 2009/0279483 A1 | 11/2009 | Falchuk et al. ................ 370/328 |
| 2010/0070376 A1 | 3/2010 | Proud et al. ..................... 705/21 |
| 2010/0070565 A1 | 3/2010 | Leblanc et al. ............... 709/203 |
| 2010/0138582 A1 | 6/2010 | Bird et al. ..................... 710/303 |
| 2010/0162325 A1 | 6/2010 | Bonar ............................. 725/76 |
| 2010/0216401 A1 | 8/2010 | Kitahara ...................... 455/41.2 |
| 2011/0107377 A1 | 5/2011 | Petrisor et al. ................. 725/76 |
| 2011/0196754 A1 | 8/2011 | Proud et al. .................... 705/16 |
| 2011/0264474 A1 | 10/2011 | Lefkowitz ......................... 705/5 |
| 2012/0004804 A1 | 1/2012 | Beams |
| 2012/0030708 A1 | 2/2012 | Margis et al. .................... 725/38 |
| 2012/0298737 A1 | 11/2012 | Thakar et al. ................. 235/375 |
| 2013/0005336 A1 | 1/2013 | Ayotte et al. .............. 455/435.1 |
| 2013/0117338 A1 | 5/2013 | Lynch et al. .................. 707/827 |
| 2013/0139269 A1 | 5/2013 | Shaikh et al. .................. 726/26 |
| 2013/0149958 A1* | 6/2013 | Davis et al. ................... 455/12.1 |
| 2013/0157687 A1 | 6/2013 | Mori .......................... 455/456.1 |
| 2013/0173796 A1 | 7/2013 | Grab et al. .................... 709/225 |
| 2014/0068010 A1 | 3/2014 | Nicholson |
| 2014/0278767 A1 | 9/2014 | Heron et al. ................. 705/7.29 |
| 2014/0279219 A1 | 9/2014 | Heron et al. ................. 705/26.8 |
| 2014/0280491 A1 | 9/2014 | Heron et al. ................. 709/203 |
| 2014/0280928 A1 | 9/2014 | Heron et al. ................. 709/224 |
| 2016/0164763 A1 | 6/2016 | Heron et al. |

OTHER PUBLICATIONS

Lui-Kwan, "In-Flight Entertainment: The Sky's the Limit", Entertainment Computing, Oct. 2000, pp. 98-101.

"Hawaiian Airlines Launches Redesigned 'Mea Ho'okipa Service'", unknown author, Trade Journal, Coventry, United Kingdom, Aug. 7, 2012, 2 pages.

Walker, Ben, "Buy Before You Fly", *Caterer & Hotelkeeper*, vol. 193, Issue 4329, Sutton, United Kingdom, Jun. 2004, 6 pages.

\* cited by examiner

IN-VEHICLE SERVICES FOR USER-PROVIDED DEVICES

CROSS-REFERENCE TO RELATED APPLICATIONS

This application is a continuation of U.S. patent application Ser. No. 13/843,864, filed on Mar. 15, 2013, entitled "IN-VEHICLE SERVICES FOR USER-PROVIDED DEVICES," which will issue as U.S. Pat. No. 8,972,598 on Mar. 3, 2015, which is related to U.S. patent application Ser. No. 13/843,990, filed Mar. 15, 2013, entitled "IN-VEHICLE SERVICES THROUGH ATTENDANT DEVICES, USER-PROVIDED DEVICES, AND/OR AN IN-VEHICLE COMPUTER SYSTEM" (issued as U.S. Pat. No. 8,751,646 on Jun. 10, 2014), U.S. patent application Ser. No. 13/844,089, filed on Mar. 15, 2013, entitled "PRE-TRANSIT AND POST-TRANSIT FACILITATION OF IN-VEHICLE SERVICES" (issued as U.S. Pat. No. 8,744,926 on Jun. 3, 2014), and U.S. patent application Ser. No. 13/844,169, filed Mar. 15, 2013, entitled "ADMINISTRATION AND CUSTOMIZATION PLATFORM FOR IN-VEHICLE-SERVICES" (issued as U.S. Pat. No. 8,719,064 on May 6, 2014), the contents of which are hereby incorporated herein by reference in their entirety.

FIELD OF THE DISCLOSURE

This disclosure relates to facilitating the provision of in-vehicle services to user-provided devices that may be owned and brought onto a vehicle by a user.

BACKGROUND

Transit providers, such as airlines, bus companies, railway companies, taxi companies, limousine companies, etc., may install in-vehicle service systems in their vehicles to provide in-vehicle services to entertain their passengers, enable attendants to better serve the passengers, and/or otherwise provide enhanced services during transit on the vehicle. In-vehicle services may include provision of electronic content (e.g., movies, games, etc.), beverages, meals, blankets, pillows, headphones, access to retail shopping experiences, facilitation of communications (e.g., 1-way, 2-way, etc.), and/or other items or services. For example, commercial airlines oftentimes equip their airplanes with in-flight entertainment (IFE) systems to provide their passengers with entertainment while in-transit to their destinations. However, among other issues, conventional IFE systems are heavy, expensive, complex, and/or behind current consumer electronics technology. For instance, conventional IFE systems require wiring and hardware such as seatback controls, seatback displays, overhead displays, or other devices that add weight to the airplane, which translates into added fuel and other costs to operate a given flight. Furthermore, conventional IFE systems may be locked into using the same hardware for a substantial time due to costs, compatibility, or other issues related to upgrading or replacing such systems.

SUMMARY

One aspect of the disclosure relates to a system configured to facilitate in-vehicle services for user-provided devices such as devices that are owned by and brought onto a vehicle, or similar devices that are rented by users, in accordance with one or more implementations. In some implementations, an in-vehicle computer system may facilitate (e.g., establish or accept) one or more communication sessions with one or more user-provided devices. The in-vehicle computer system and the user-provided devices may utilize those communication sessions to send and/or receive in-vehicle services or requests for in-vehicle services.

In some implementations, the in-vehicle computer system may provide in-vehicle services to the user-provided devices with or without a connection to the Internet. For example, the in-vehicle computer system may provide in-vehicle services based on content that is stored locally at one or more of the in-vehicle computer system or the user-provided devices, and/or provide in-vehicle services based on content that is obtained via a network such as the Internet.

In some implementations, at least some content items provided by the in-vehicle server system may be obtained from a third party content provider and stored at the in-vehicle computer system such that the user-provided devices may download those content items from the in-vehicle computer system rather than the third party content provider during transit even without a connection to the Internet. Ordinarily, the third party content provider may provide applications, movies, music, or other content to the user-provider devices over a network connection such as the Internet. By partnering with third party content providers, obtaining third party content, and storing such content, the in-vehicle services platform described herein may enable users to obtain access to such content through their user-provided devices with or without Internet access during transit.

In some implementations, the in-vehicle computer system may include one or more servers. The server(s) may be configured to communicate with one or more client computing devices according to a client/server architecture and/or other communication architecture that allows computing devices to communicate with one another. The users may access the system via the client computing devices. The client computing devices may include one or more user-provided devices.

The server(s) may be configured to execute one or more computer program modules to facilitate in-vehicle services for user-provided devices. The computer program modules may include one or more of a communication session module, a content manager module, a passenger module, a service module, a content access module, and/or other modules.

The communication session module may be configured to facilitate one or more communication sessions with one or more user-provided devices. The content manager module may be configured to store one or more content items available to the one or more user-provided devices. The one or more content items may include one or more of documents, songs, video clips, audio books, e-books, games, applications, or other content items.

The passenger module may be configured to determine passenger information associated with one or more users of the one or more user-provided devices on the vehicle. In some implementations, the passenger information may include one or more of identifying information, preference information, history information, status information, and/or other information associated with the one or more users.

The service module may be configured to provide, via the one or more communication sessions, a list of the one or more content items to the one or more user-provided devices. In certain implementations, the service module may be configured to determine a time remaining in transit for the one or more users of the one or more user-provided devices.

The service module may provide at least one content item in the list based on the determined time remaining. The time remaining may, for instance, may be determined based on an estimated time of arrival at one or more stops, an estimated time of arrival at the final destination, or other factors. Such functionality may be triggered via operation of an "amuse me" or similar input that automatically causes the service module to identify content items that may be consumed within the time remaining.

In various implementations, the service module may be configured to provide a second list that includes at least one content item to at least one user-provided device responsive to a search request from the at least one user-provided device. In some implementations, the service module may be configured to provide the second list based on the determined time remaining.

The service module may be configured to receive a selection of at least one content item from at least one user-provided device. The content access module may be configured to provide, via the one or more communication sessions, access to the at least one content item to the at least one user-provided device based on the selection. In certain implementations, the service module may be configured to provide the list of the one or more content items to the one or more user-provided devices by providing at least some content items stored at the in-vehicle computer system and obtained from a third party content store such that the at least some content items is obtainable from the in-vehicle computer system without a connection to the third party content store.

In some implementations, the service module may be configured to receive the selection of the at least one content item from the at least one user-provided device. The content access module may be configured to provide the access to the at least one content item: (1) in exchange for payment in accordance to a first set of costs responsive to an indication from the at least one user-provided device to obtain the at least one content item from the in-vehicle computer system without a connection to the third party content store; or (2) in exchange for payment in accordance to a second set of costs that is different from the first set of costs responsive to an indication to obtain the at least one content item via a connection to the third party content store.

In various implementations, the content access module may be configured to provide the access to the at least one content item to the at least one user-provided device without a connection to the Internet. In some implementations, the service module may be configured to provide the list to the one or more user-provided devices such that the list indicates: (1) a first set of content items that are stored at the in-vehicle computer system and accessible to the one or more user-provided devices without connecting to the Internet; and (2) a second set of content items that are accessible by connecting to the Internet.

In certain implementations, the content access module may be configured to provide the access to the at least one content item for temporary storage at the at least one user-provided device. By way of example, the access to the at least one content item may be provided such that the at least one content item expires and becomes inaccessible via the at least one user-provided device based on a time remaining in transit or a determination that at least one user of the at least one user-provided device is no longer in transit. In some implementations, the content access module may be configured to provide an indication to the at least one user-provided device that the at least one user of the at least one user-provided device is no longer in transit, wherein the expiration of the at least one content item is based on the indication.

In various implementations, the content access module may be configured to provide the access to the at least one content item based on a determination that at least one user of the at least one user-provided device is currently in transit. In one implementation, the content access module may revoke the access to the at least one content item based on a determination that the at least one user of the at least one user-provided device is no longer in transit. The determination of whether the at least one user is currently in transit or whether the at least one user is no longer in transit may, for instance, be based on a current location of the at least one user, an estimated time of arrival at a destination of the at least one user, or other factors.

In certain implementations, the content access module may be configured to provide the access to the at least one content item for persistent storage at the at least one user-provided device such that the at least one content item is accessible after at least one user of the at least one user-provided device is no longer in transit.

In some implementations, the content access module may be configured to communicate with one or more computer systems that are external to the vehicle to determine content provisioning information associated with the one or more content items. The content access module may provide the access to the at least one content item to the at least one user-provided device based on the content provisioning information.

In various implementations, the service module may be configured to provide information indicating a current location of the vehicle to the one or more user-provided devices. In some implementations, the service module may be configured to provide one or more of media content, an interactive display, or points of interest information to the one or more user-provided devices based on the current location.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
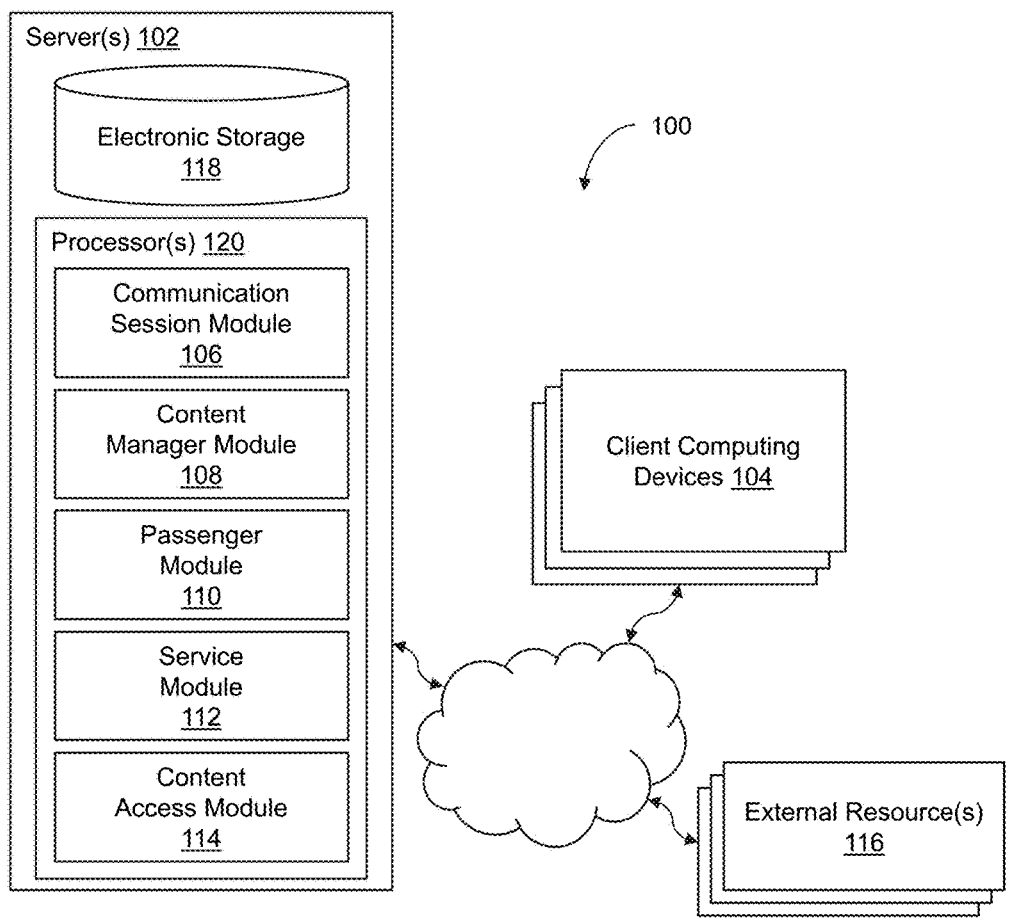
FIG. 1 illustrates a system configured to facilitate in-vehicle services for user-provided devices, in accordance with one or more implementations.

FIG. 1 illustrates a system 100 configured to facilitate in-vehicle services for user-provided devices, in accordance with one or more implementations. In some implementations, system 100 may include an in-vehicle computer system. The in-vehicle computer system may include one or more servers 102. The server(s) 102 may be configured to communicate with one or more client computing devices 104 according to a client/server or other architecture. The users may access the system 100 via the client computing devices 104. The client computing devices may include, and be used interchangeably herein with, one or more user-provided devices. Users of user-provided devices may include passengers, attendants, other crew members, or other users.

As used herein, a user-provided device is provided by a user during transit on a vehicle (e.g., a user-provided device may be owned by the user and brought onto the vehicle by the user, may be owned by a transit provider and rented by the user, etc.). The user-provided device may include applications for in-vehicle services as well as other user applications unrelated to the in-vehicle services. The user-provided device may not be a dedicated device for use with the in-vehicle computer system. By way of example, the one or more user-provided devices may include one or more of laptop computers, tablet computers, netbooks, smartphones, or other computing devices that are provided by one or more users during transit on a vehicle. In one scenario, airlines that utilize the in-vehicle computer system of the system 100 may avoid or otherwise reduce costs associated with purchasing, installing, or maintaining user equipment because their passengers (which may be used interchangeably with the term "user" herein) may bring their own generally-applicable devices to interact with the in-vehicle computer system.

Server(s) 102 may be configured to execute one or more computer program modules to facilitate in-vehicle services for user-provided devices. The computer program modules may include one or more of a communication session module 106, a content manager module 108, a passenger module 110, a service module 112, a content access module 114, and/or other modules.

Communication session module 106 may be configured to facilitate one or more communication sessions with one or more user-provided devices. In some implementations, the one or more communication sessions that are established between the in-vehicle computer system and the one or more user-provided devices may enable the in-vehicle computer system to provide information to or receive information from the one or more user-provided devices with or without a connection to a network external to the vehicle (e.g., the Internet) by providing or receiving the information via the one or more communication sessions.

Content manager module 108 may be configured to store one or more content items available to the one or more user-provided devices. By way of example, the content manager module 108 may store the one or more content items in an electronic storage 118 of server(s) 102. The one or more content items may include one or more of documents, songs, video clips, audio books, e-books, games, applications, and/or other content items.

Figure 2:
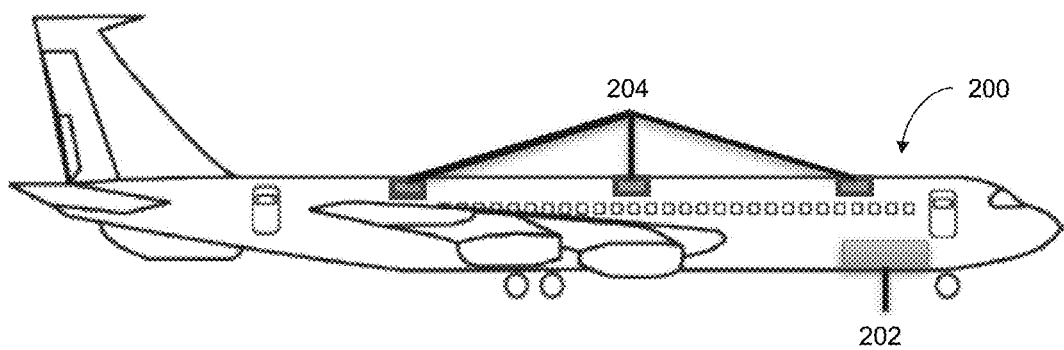
FIG. 2 illustrates a diagram of an in-vehicle computer system on a vehicle, in accordance with one or more implementations.

For example, FIG. 2 illustrates a diagram of an in-vehicle computer system 200 on a vehicle (e.g., a plane), in accordance with one or more implementations. As shown, in-vehicle computer system 200 includes an electronic equipment (EE) bay 202 and one or more wireless access points (WAPs) 204. EE bay 202 may include server(s) 102 having electronic storage 118 in which the one or more content items are stored. To interact with the user-provided devices, in-vehicle computer system 200 may utilize WAPs 204 (although wired connections may also be used) to facilitate the one or more communication sessions with the one or more user-provided devices.

Referring back to FIG. 1, passenger module 110 may be configured to determine passenger information associated with one or more users of the one or more user-provided devices on the vehicle. In some implementations, the passenger information may include one or more of identifying information, preference information, history information, status information, and/or other information associated with the one or more users. Identifying information may include a name of a user, an account identifier associated with the user, an address of the user, or other information that can be used to identify the user. Preference information may indicate content items that the user may like/dislike, accommodations that the user may like/dislike (e.g., assistance, service items, food, beverages, lodging, etc.), or other preferences associated with the user. History information may indicate content items that the user has previously consumed, accommodations that the user has previously requested, traveling history, or other previous events associated with the user. Status information may indicate a seat class status (e.g., business class, economy class, etc.), a frequent flyer status, or other statuses associated with the user.

In one scenario, passenger module 110 may obtain preference information associated with the one or more users prior to the boarding of the one or more users and/or at other times. Passenger module 110 may provide the preference information to content manager module 108. Content manager module 108 may utilize the preference information to obtain content items from a third party content store (such as the APPLE AppStore, GOOGLE PLAY, etc.) that the one or more users may likely consume during transit on the vehicle and store those content items in electronic storage 118 such that the content items can be obtained by the one or more user-provided devices without a connection to the third party content store. In this way, content items that the one or more users are likely to consume while in-transit will already be stored at the in-vehicle computer system to reduce the need for a connection to the third party content store (e.g., via the Internet) while the users are in-transit. Some benefits may, for instance, include faster content downloads by eliminating the time needed to first obtain the content from the Internet along with reduced data traffic on an existing Internet connection of the in-vehicle computer system.

Figure 3:
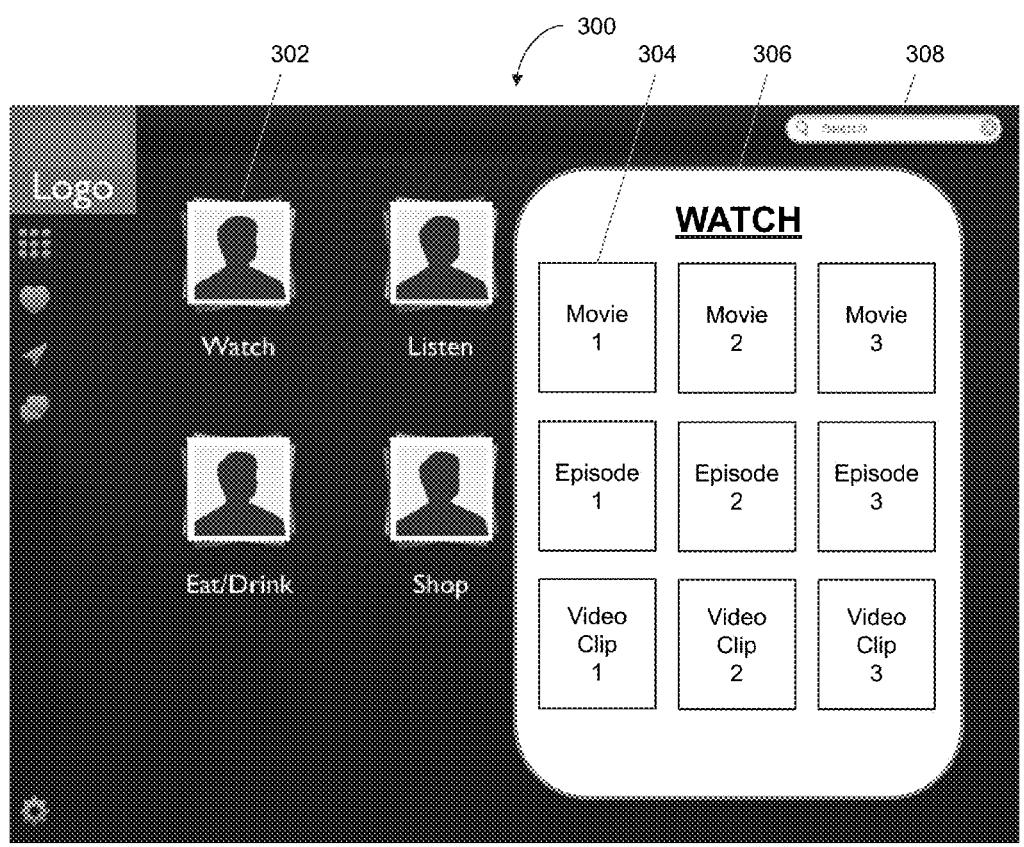
FIG. 3 illustrates a diagram of a user interface of an application on a user-provided device for facilitating in-vehicle services, in accordance with one or more implementations.

Service module 112 may be configured to provide, via the one or more communication sessions, a list of the one or more content items (available to the one or more user-provided devices) to the one or more user-provided devices. For example, FIG. 3 illustrates a diagram of a user interface 300 of an application on a user-provided device for facilitating in-vehicle services, in accordance with one or more implementations. As shown, the user interface 300 includes options 302 (e.g., watch, listen, read, play, eat/drink, shop, explore, etc.) relating to servicing the user of the user-provided device. In this scenario, the user has indicated that she wants to access content items that may be watched. As such, the application associated with user interface 300 may send a request for watchable content items 304 to the in-vehicle computer system. In response to receiving the request, service module 112 of the in-vehicle computer system may provide (to the application) a list of watchable content items 304 that may be streamed or downloaded by the user. As such, the application may cause user interface 300 to present a window 306 that includes watchable content items 304 based on the provided list.

In certain implementations, service module 112 may be configured to determine a time remaining in transit for the one or more users of the one or more user-provided devices. Service module 112 may provide at least one content item in the list based on the determined time remaining. The time remaining may, for instance, be determined based on an estimated time of arrival at one or more stops, an estimated time of arrival at the final destination, or other factors. In one use case, with respect to FIG. 3, service module 112 may determine that there is only 30 minutes remaining before the user of user interface 300 arrives at her destination. As such, service module 112 may provide the list of watchable content items 304 such that some of the watchable content items 304 may be completely watched by the user before she arrives at her destination. As an example, episodes 1, 2, and 3 along with video clips 1, 2, and 3 may be selected by service module 112 to be included in the list of watchable content items 304 because those episodes and video clips are less than 30 minutes long.

In various implementations, service module 112 may be configured to provide a second list that includes at least one content item to at least one user-provided device responsive to a search request from the at least one user-provided device. In some implementations, service module 112 may be configured to provide the second list based on the determined time remaining. Referring to FIG. 3, for instance, the user of user interface 300 may input one or more keywords into a search box 308 to initiate a search request based on the keywords. Upon receiving the search request, service module 112 may utilize the keywords along with the determined time remaining in transit for the user to determine content items that the user can enjoyed within the determined time remaining and that correspond to the keywords. Service module 112 may generate a list that includes those determined content items and provide the list to the application on the user-provided device associated with the user.

Service module 112 may be configured to receive a selection of at least one content item from at least one user-provided device. Content access module 114 may be configured to provide, via the one or more communication sessions, access to the at least one content item to the at least one user-provided device based on the selection. As discussed, with respect with to FIG. 3, an application on the user-provided device associated with user interface 300 may receive a list that includes watchable content items 304 and present the watchable content items 304 as options for the user to select. If, for instance, the user selects "Movie 1," the selection may be received by service module 112. Service module 112 may then forward the selection to content access module 114 to process the selection. After processing the selection, content access module 114 may provide access to the watchable content item 304 associated with "Movie 1" to the user-provided device via an established communication session between the in-vehicle computer system and the user-provided device. In one use case, content access module 114 may provide the access to the watchable content item 304 by facilitating streaming of the watchable content item 304 to the user-provided device. In another use case, content access module 114 may provide the access to the watchable content item 304 by facilitating a download of the watchable content item 304 to the user-provided device.

As indicated, in certain implementations, service module 112 may be configured to provide the list of the one or more content items to the one or more user-provided devices by providing at least some content items stored at the in-vehicle computer system and obtained from a third party content store such that the at least some content items is obtainable from the in-vehicle computer system without a connection to the third party content store. Referring to FIG. 3, for instance, some of the watchable content items 304 may be obtained by the associated user-provided device from the in-vehicle computer system without a connection to the third party content store because those watchable content items 304 may have been previously obtained from the third-party content store and pre-cached (e.g., stored) at the in-vehicle computer system.

In some implementations, service module 112 may be configured to receive the selection of the at least one content item from the at least one user-provided device. Content access module 114 may be configured to provide the access to the at least one content item: (1) in exchange for payment in accordance to a first set of costs responsive to an indication from the at least one user-provided device to obtain the at least one content item from the in-vehicle computer system without a connection to the third party content store; or (2) in exchange for payment in accordance to a second set of costs that is different from the first set of costs responsive to an indication to obtain the at least one content item via a connection to the third party content store.

By way of example, with respect to FIG. 3, some of the watchable content items 304 may have been previously obtained from a third-party content store and stored at the in-vehicle computer system to enable the one or more used-provided devices to obtain access to those watchable content items 304 without a connection to the third party content store. On the other hand, other ones of the watchable content items 304 may not be stored at the in-vehicle computer system and may require a connection to the third party content store to obtain the access to those other watchable content items 304. In one use case, if a user selects one of the watchable content items 304 that is not currently stored at the in-vehicle computer system, user interface 300 may inform the user that the selected watchable content item 304 is not currently available via the in-vehicle computer system's "Private Store," and that access to the selected watchable content item 304 may be obtained from the third party content store for an additional surcharge fee. If, for instance, the user agrees to pay the additional surcharge fee to obtain the selected watchable content item 304 from the third party content store, content access module 114 may establish a connection to the third party content store for the user-provided device of the user to obtain the access from the third party content store. Subsequently, the user may be charged for a total cost that includes the regular price of obtaining the selected watchable content item 304 (e.g., the cost to obtain the selected content item from the in-vehicle computer system without a connection to the third party content store) and the additional surcharge fee.

As such, in one implementation, the payment associated with obtaining the at least one content item from the in-vehicle computer system without a connection to the third party content store may be less than the payment associated with obtaining the at least one content item via a connection to the third party content store. In another implementation, the payment associated with obtaining the at least one content item from the in-vehicle computer system without a connection to the third party content store may be greater than the payment associated with obtaining the at least one content item via a connection to the third party content store.

In yet another implementation, the payment associated with obtaining the at least one content item from the in-vehicle computer system without a connection to the third party content store may be equal to the payment associated with obtaining the at least one content item via a connection to the third party content store. For example, although one or more costs in the first set (e.g., obtaining a content item without a connection to the third party content store) may be different from one or more corresponding costs in the second set (e.g., obtaining the content item via a connection to the third party content store), it is contemplated that corresponding costs in the first and second set of costs may be the same for a particular content item (e.g., payment by a user for access to a particular content item may be the same regardless of whether the content item is obtained from a content repository at the in-vehicle computer system or from the third party content store via a connection to the third party content store).

As discussed, in various implementations, content access module 114 may be configured to provide the access to the at least one content item to the at least one user-provided device without a connection to the Internet. For example, in one use case, if a particular content item is stored at the in-vehicle computer system, the access to the content item may be provided to a user-provided device without a connection to the Internet. In some scenarios, providing the access to the content item directly from the in-vehicle computer system (e.g., without needing to obtain the access via a connection to the Internet) may enable high-quality access to the content item. In one scenario, for instance, the access to the content item may be provided via streaming of the content item. The streaming of the content item directly from a content repository at the in-vehicle computer system may of a higher quality stream compared to a streaming of the content item via a connection to the Internet as a result of generally higher latency, lower bandwidth, and other factors associated with obtaining content access via an external network.

In some implementations, service module 112 may be configured to provide the list to the one or more user-provided devices such that the list indicates: (1) a first set of content items that are stored at the in-vehicle computer system and accessible to the one or more user-provided devices without connecting to the Internet; and (2) a second set of content items that are accessible by connecting to the Internet.

For example, with respect to FIG. 3, the application associated with user interface 300 may send a request for watchable content items 304 to the in-vehicle computer system when the user has indicated that she wants to access content items that may be watched. In response to receive the request, service module 112 of the in-vehicle computer system may provide (to the application) a list of watchable content items 304 that may be streamed or downloaded by the user. As such, the application may cause user interface 300 to present a window 306 that includes watchable content items 304 based on the provided list. The provided list may indicate some watchable content items 304 that are stored at the in-vehicle computer system along with other watchable content items 304 that are not currently stored at the in-vehicle computer system and require a connection to the Internet to obtain access to those other watchable content items 304. Thus, user interface 300 may, for instance, indicate to the user the watchable content items 304 that can be accessed without a connection to the Internet and the watchable content items 304 that require a connection to the Internet to access those watchable content items 304. Such indications may be provided to the user before one or more selections of watchable content items by the user are initiated or when those selections are initiated.

In certain implementations, content access module 114 may be configured to provide the access to the at least one content item for temporary storage at the at least one user-provided device. By way of example, the access to the at least one content item may be provided such that the at least one content item expires and becomes inaccessible via the at least one user-provided device based on a time remaining in transit or a determination that at least one user of the at least one user-provided device is no longer in transit. In one use case, when a movie is selected by a user at a user-provided device, content access module 114 may provide to the user-provided device a media file of the selected movie that is configured to expire when the user is no longer in transit such that the media file is removed from the user-provided device or otherwise becomes inaccessible to the user. The media file may, for instance, be set to expire based on an expiration time indicated in the media file (e.g., an expiration time derived from the time remaining in transit for the user when the media file is provided to the user-provided device), a separate indication stored by an application on the user-provided device (e.g., the application may remove the media file when the media file is set to expire), or other approach.

In various implementations, content access module 114 may be configured to provide an indication to the at least one user-provided device that the at least one user of the at least one user-provided device is no longer in transit, wherein the expiration of the at least one content item is based on the indication. As an example, in one scenario, when a movie is selected by a user at a user-provided device, content access module 114 may provide to the user-provided device a media file of the selected movie. When content access module 114 determines that user is no longer in transit, content access module 114 may provide the indication that the user is no longer in transit to an application on the user-provided device. In response to the indication, the application may remove the media file or otherwise cause the media file to become inaccessible to the user.

In some implementations, content access module 114 may be configured to provide the access to the at least one content item based on a determination that at least one user of the at least one user-provided device is currently in transit. In one implementation, content access module 114 may revoke the access to the at least one content item based on a determination that the at least one user of the at least one user-provided device is no longer in transit. The determination of whether the at least one user is currently in transit or whether the at least one user is no longer in transit may, for instance, be based on a current location of the at least one user (e.g., inside the vehicle, along a route traveled by the vehicle, etc.), an estimated time of arrival at a destination of the at least one user, or other factors.

By way of example, when a movie is selected by a user at a user-provided device, content access module 114 may stream the movie to the user-provided device in response to determining that the user is still in transit. Content access module 114 may continue to stream the movie so long as it is determined that the user is still in transit. However, in response to determining that the user is no longer in transit, content access module 114 may stop the streaming of the movie. In one use case, for instance, in-vehicle services may include free streaming of movies or other content while passengers are currently traveling with a particular transit provider. Due to licensing restrictions associated with streaming of the movies or other content, a provider of the in-vehicle services may want to limit the access to the movies or other content for their passengers to the periods in which the passengers are actually traveling with one or more transit providers. In this way, accessing to the movies or other content may be revoked when the passengers have arrived at their destination or are no longer in transit on a vehicle associated with the one or more transit providers.

In certain implementations, content access module 114 may be configured to provide the access to the at least one content item for persistent storage at the at least one user-provided device such that the at least one content item is accessible after at least one user of the at least one user-provided device is no longer in transit. By way of example, agreements with content providers may enable a provider of in-vehicle services to "sell" content to users. In one use case, when a movie is selected by a user at a user-provided device, content access module 114 may provide to the user-provided device a media file of the selected movie that may remain accessible to the user for playback or other suitable use even after the user has arrived at her destination.

In some implementations, content access module 114 may be configured to communicate with one or more computer systems that are external to the vehicle to determine content provisioning information associated with the one or more content items. Content access module 114 may provide the access to the at least one content item to the at least one user-provided device based on the content provisioning information. For example, as mentioned, an in-vehicle computer system may pre-store content items at a content repository (e.g., within the vehicle) of the in-vehicle computer system based on passenger information associated with one or more passengers that may be boarding the vehicle. Thus, content access module 114 may communicate with external networks (e.g., content provider networks, a central network associated with the in-vehicle computer system, etc.) to determine the content provisioning information associated with the pre-stored content items.

As another example, content access module 114 may determine content provisioning information for content items that are offered as part of in-vehicle service to passengers regardless of whether the content items are pre-stored. As such, content access module 114 or other modules of the in-vehicle computer system may utilize the content provisioning information to offer the content items to passengers. The content provisioning information may, for instance, indicate how access to the content items may be provided to passengers (e.g., streaming, downloading, etc.), the duration of the access to the content items (e.g., when the access should be provided, when the access should be revoked, etc.), the costs associated with the content items (e.g., the costs to the in-vehicle service provider for enabling passengers to access the content items, the costs to the passengers for being provided the access to the content items, etc.), or other provisions associated with the content items.

In various implementations, service module 112 may be configured to provide information indicating a current location of the vehicle to the one or more user-provided devices. In one scenario, the information indicating the current location may be provided to an application of a user-provided device. The application may, for instance, utilize the current location information to display the current location of the vehicle on the user-provided device. For example, the application may display a map on the user-provided device and enable the user of the user-provided device to zoom in and out on the map to view details on a particular area, to see an overview of one or more areas or points of interest near the current location, etc.

In some implementations, service module 112 may be configured to provide one or more of media content, an interactive display, or points of interest information to the one or more user-provided devices based on the current location. In one use case, points of interest information associated with the current location may be provided to an application of a user-provided device as the vehicle (e.g., a plane) is flying. The application may utilize the points of interest information to display interesting facts, advertisements, recommendations, or other content associated with the points of interest information on the user-provided device. For example, if the application displays a map on the user-provided device, the user may be enabled to search the map for points of interests, details on the points of interests, etc.

Server(s) 102, client computing devices 104, external resources 116, and/or other components may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing devices 104, external resources 116, and/or other components may be operatively linked via some other communication media.

A given client computing device 104 may include one or more processors configured to execute computer program modules. The computer program modules may be configured to enable a user associated with client computing device 104 to interface with system 100 and/or external resources 116, and/or provide other functionality attributed herein to client computing devices 104. By way of example, client computing device 104 may include one or more of a laptop computer, a tablet computer, a netbook, a smartphone, or other computing devices that are generally portable and are able to be carried onto a vehicle by a user.

External resources 116 may include sources of information, hosts and/or providers outside of system 100, external entities participating with system 100, and/or other resources. In some implementations, some or all of the functionality attributed herein to external resources 116 may be provided by resources included in system 100.

In some implementations, server(s) 102 may include an electronic storage 118, one or more processor(s) 120, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise non-transitory storage media that electronically stores information. The electronic storage media of electronic storage 118 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing devices 104, and/or other information that enables server(s) 102 to function as described herein.

Processor(s) 120 is configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 1 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. Processor(s) 120 may be configured to execute modules 106, 108, 110, 112, 114, and/or other modules. Processor(s) 120 may be configured to execute modules 106, 108, 110, 112, 114, and/or other modules by software; hardware; firmware; some combination of software, hardware, and/or firmware; and/or other mechanisms for configuring processing capabilities on processor(s) 120.

It should be appreciated that although modules 106, 108, 110, 112, and 114 are illustrated in FIG. 1 as being co-located within a single processing unit, in implementations in which processor(s) 120 includes multiple processing units, one or more of modules 106, 108, 110, 112, and/or 114 may be located remotely from the other modules. The description of the functionality provided by the different modules 106, 108, 110, 112, and/or 114 described below is for illustrative purposes, and is not intended to be limiting, as any of modules 106, 108, 110, 112, and/or 114 may provide more or less functionality than is described. For example, one or more of modules 106, 108, 110, 112, and/or 114 may be eliminated, and some or all of its functionality may be provided by other ones of modules 106, 108, 110, 112, and/or 114. As another example, processor(s) 120 may be configured to execute one or more additional modules that may perform some or all of the functionality attributed below to one of modules 106, 108, 110, 112, and/or 114.

Figure 4:
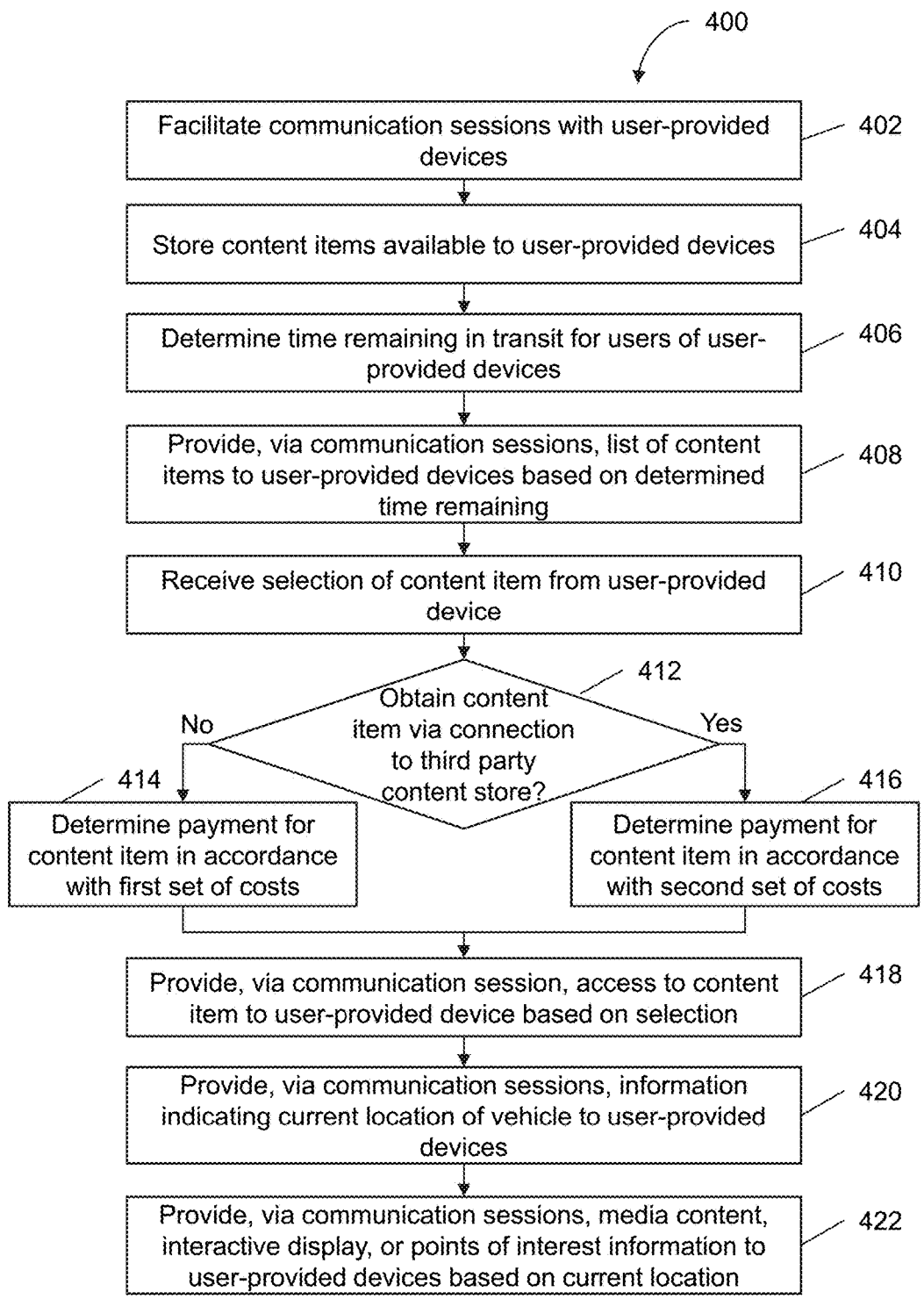
FIG. 4 illustrates a method for facilitating in-vehicle services for user-provided devices, in accordance with one or more implementations.

FIG. 4 illustrates a method for facilitating in-vehicle services for user-provided devices, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, one or more communication sessions with one or more user-provided devices may be facilitated. Operation 402 may be performed by a communication session module that is the same as or similar to communication session module 106, in accordance with one or more implementations.

At an operation 404, one or more content items available to the one or more user-provided devices may be stored. For example, the one or more content items may be stored at the in-vehicle computer system. Operation 404 may be performed by a content manager module that is the same as or similar to content manager module 108, in accordance with one or more implementations.

In certain implementations, passenger information associated with one or more users of the one or more user-provided devices may be determined. For example, the passenger information may include one or more of identifying information, preference information, history information, or status information associated with the one or more users. In some implementations, the storage of the one or more content items available to the one or more user-provided devices may be based on the passenger information. Determination of the passenger information may be performed by a passenger module that is the same as or similar to passenger module 110, in accordance with one or more implementations.

At an operation 406, a time remaining in transit for the one or more users of the one or more user-provided devices may be determined. The time remaining may, for instance, be determined based on an estimated time of arrival at one or more stops, an estimated time of arrival at the final destination, or other factors. Operation 406 may be performed by a service module that is the same as or similar to service module 112, in accordance with one or more implementations.

At an operation 408, a list of the one or more content items may be provided via the one or more communication sessions to the one or more user-provided devices. As shown, in some implementations, the list of the one or more content items may be provided based on the determined time remaining. For example, the list of the one or more content items may include at least one content item that corresponds to the determined time remaining (e.g., full playback of the at least one content item is determined to be less than or equal to the determined time remaining, playback of the at least one content item for less than or equal to the determined time remaining is determined as a sufficiently enjoyable user experience, etc.). Operation 408 may be performed by a service module that is the same as or similar to service module 112, in accordance with one or more implementations.

In various implementations, the list of the one or more content items (or a second list) may be provided to the at least one user-provided device such that the list (or the second list) includes the at least one content item. The list (or the second list) may, for instance, be provided in response to a search request from the at least one user-provided device. As indicated, the list (or the second list) may be based on a determined time remaining in transit for the at least one user of the at least one user-provided device. Such operations may be performed by a service module that is the same as or similar to service module 112, in accordance with one or more implementations.

At an operation 410, a selection of at least one content item may be received from at least one user-provided device. Operation 410 may be performed by a service module that is the same as or similar to service module 112, in accordance with one or more implementations.

At an operation 412, a determination of whether the at least one content item is to be obtained via a connection to a third party content store may be effectuated. In some implementations, the determination of whether the at least one content item is to be obtained via a connection to the third party content store may be based on an indication may be received from the at least one-user provided device. The indication may, for instance, be to obtain the at least one content item from the in-vehicle computer system without a connection to the third party content store, or the indication may be to obtain the at least one content item via a connection to the third party content store. Operation 412 may be performed by a service module that is the same as or similar to service module 112, in accordance with one or more implementations. Responsive to a determination that the at least one content item is not to be obtained via a connection to the third party content store, method 400 may proceed to an operation 414. On the other hand, responsive to a determination that the at least one content item is to be obtained via a connection to the third party content store, method 400 may proceed to an operation 416.

At operation 414, payment for the at least one content item may be determined in accordance with a first set of costs. As indicated, the determination of the payment for the at least one content item in accordance with the first set of costs may be responsive to a determination that the at least one content item is not to be obtained via a connection to the third party content store. Operation 414 may be performed by a content access module that is the same as or similar to content access module 114, in accordance with one or more implementations.

At operation 416, payment for the at least one content item may be determined in accordance with a second set of costs that is different from the first set of costs. As indicated, the determination of the payment for the at least one content item in accordance with the second set of costs may be responsive to a determination that the at least one content item is to be obtained via a connection to the third party content store. Operation 416 may be performed by a content access module that is the same as or similar to content access module 114, in accordance with one or more implementations.

At an operation 418, access to the at least one content item may be provided via the one or more communication sessions to the at least one user-provided device based on the selection. As indicated, in one implementation, the at least one content item may be provided to the at least one user provided from the in-vehicle computer system without a connection to the third party content store (e.g., responsive to the determination that the at least one content item is not to be obtained via a connection to the third party content store). In another implementation, the at least one content item may be provided to the at least one user-provided device via a connection to the third party content store (e.g., responsive to the determination that the at least one content item is to be obtained via a connection to the third party content store). Operation 418 may be performed by a content access module that is the same as or similar to content access module 114, in accordance with one or more implementations.

In certain implementations, with respect to operation 418, the access to the at least one content item may be provided for temporary storage at the at least one user-provided device such that the at least one content item expires and becomes inaccessible via the at least one user-provided device based on a time remaining in transit or a determination that at least one user of the at least one user-provided device is no longer in transit. In some implementations, an indication that the at least one user of the at least one user-provided device is no longer in transit may be provided to the at least one user-provided device. The expiration of the at least one content item may be based on the indication.

In various implementations, with respect to operation 418, the access to the at least one content item may be provided for persistent storage at the at least one user-provided device such that the at least one content item is accessible after at least one user of the at least one user-provided device is no longer in transit. In some implementations, the access to the at least one content item may be provided to the at least one user-provided device without a connection to the Internet.

At an operation 420, information indicating a current location of the vehicle (e.g., hosting the in-vehicle computer system) may be provided via the one or more communication sessions to the one or more user-provided devices. Operation 420 may be performed by a service module that is the same as or similar to service module 112, in accordance with one or more implementations.

At an operation 422, one or more of media content, an interactive display, or posts of interest information may be provided to the one or more user-provided devices via the one or more communication sessions based on the current information. Operation 422 may be performed by a service module that is the same as or similar to service module 112, in accordance with one or more implementations.

Figure 5:
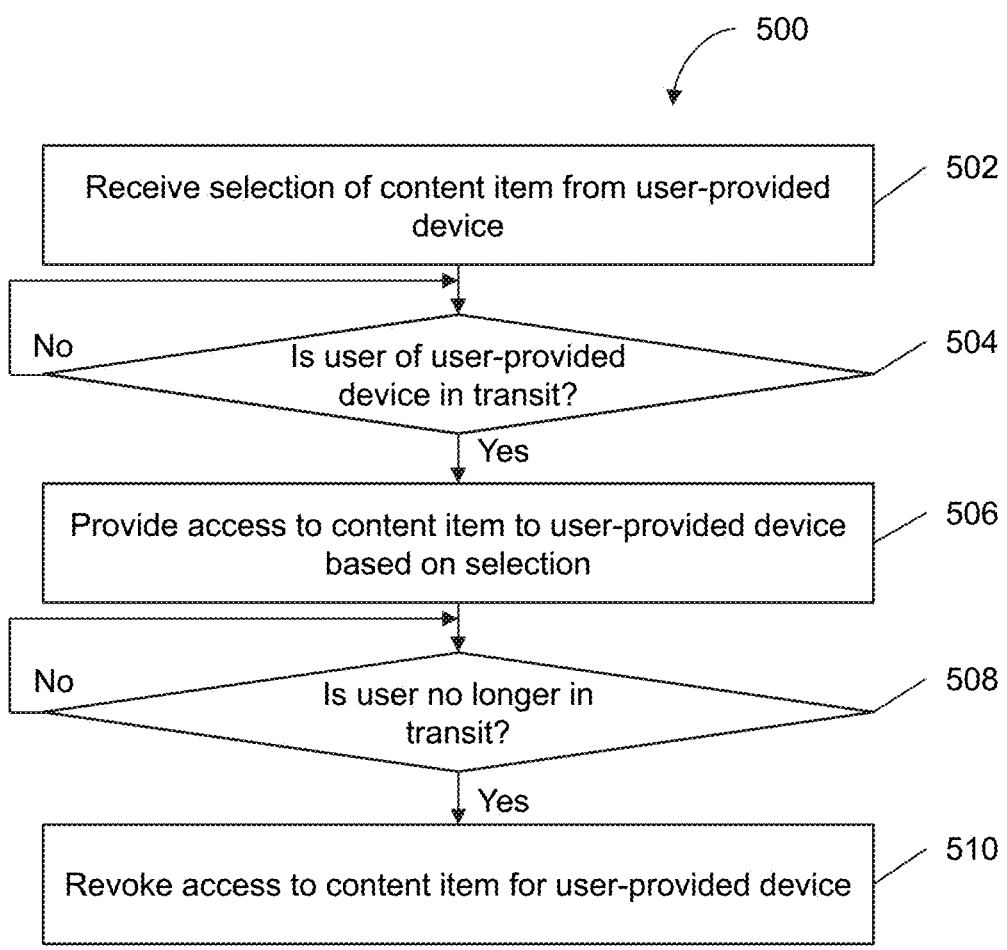
FIG. 5 illustrates a method for providing and revoking content access, in accordance with one or more implementations.

FIG. 5 illustrates a method for providing and revoking content access, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, a selection of at least one content item may be received from at least one user-provided device. Operation 502 may be performed by a service module that is the same as or similar to service module 112, in accordance with one or more implementations.

At an operation 504, a determination of whether at least one user of the at least one user-provided device is currently in transit may be effectuated. The determination of whether the at least one user is currently in transit may, for instance, be based on a current location of the at least one user (e.g., inside the vehicle, along a route traveled by the vehicle, etc.), an estimated time of arrival at a destination of the at least one user, or other factors. Operation 504 may be performed by a content access module that is the same as or similar to content access module 114, in accordance with one or more implementations. Responsive to a determination that the at least one user is currently in transit, method 500 may proceed to an operation 506.

At operation 506, access to the at least one content item may be provided based on the selection. As shown, in some implementations, the access to the at least one content item may be provided responsive to the determination that the at least one user is current in transit. Operation 506 may be performed by a content access module that is the same as or similar to content access module 114, in accordance with one or more implementations.

At an operation 508, a determination of whether the at least one user is no longer in transit may be effectuated. The determination of whether the at least one user is no longer in transit may, for instance, be based on a current location of the at least one user (e.g., inside the vehicle, along a route traveled by the vehicle, etc.), an estimated time of arrival at a destination of the at least one user, or other factors. Operation 508 may be performed by a content access module that is the same as or similar to content access module 114, in accordance with one or more implementations. Responsive to a determination that the at least one user is no longer in transit, method 500 may proceed to an operation 510.

At operation 510, the access to the at least one content item may be revoked for the at least one user-provided device. For example, the access to the at least one content item may revoked such that the at least one content item may not be accessed from the at least one user-provided device. Operation 510 may be performed by a content access module that is the same as or similar to content access module 114, in accordance with one or more implementations.

Figure 6:
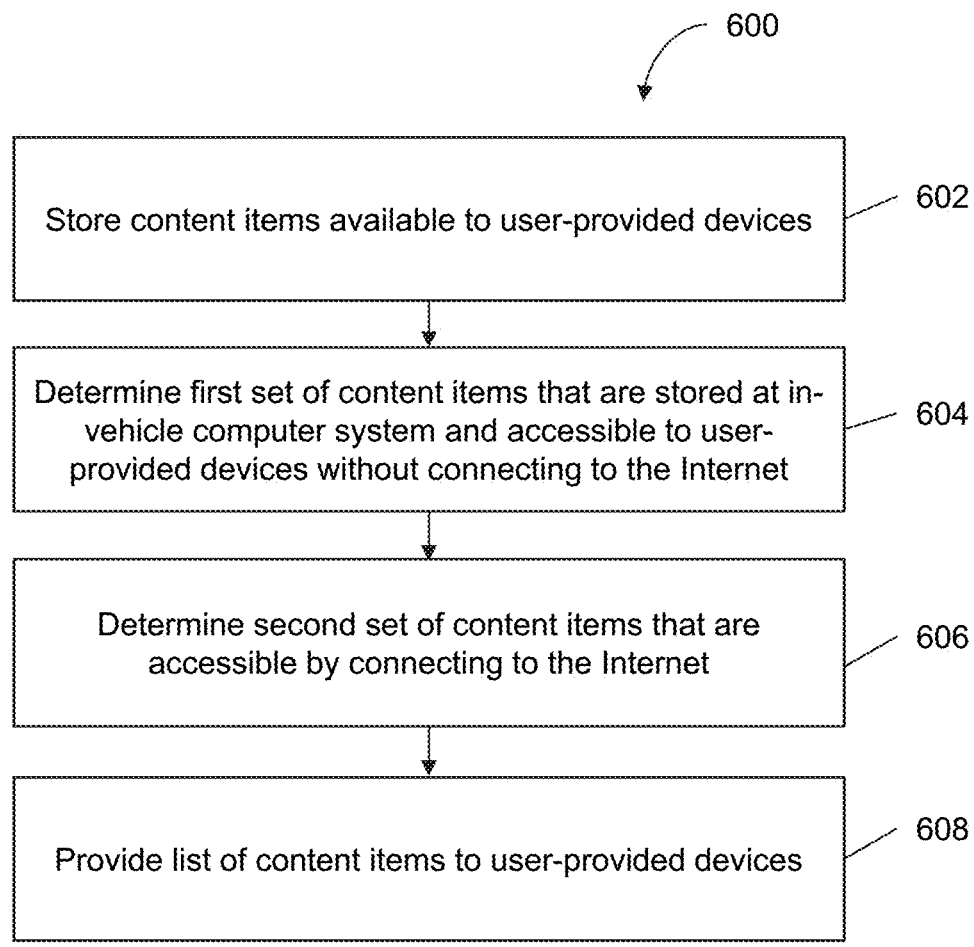
FIG. 6 illustrates a method for providing a list of content items to a user-provided device, in accordance with one or more implementations.

FIG. 6 illustrates a method for providing a list of content items to a user-provided device, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, one or more content items available to one or more user-provided devices may be stored. For example, the one or more content items may be stored at the in-vehicle computer system. Operation 602 may be performed by a content manager module that is the same as or similar to content manager module 108, in accordance with one or more implementations.

At an operation 604, a first set of one or more content items that are stored at the in-vehicle computer system and accessible to the one or more user-provided devices without connecting to the Internet may be determined. Operation 604 may be performed by a service module that is the same as or similar to service module 112, in accordance with one or more implementations.

At an operation 606, a second set of one or more content items that are accessible by connecting to the Internet may be determined. For example, the second set may include content items that are not currently stored at the in-vehicle computer system. Operation 606 may be performed by a service module that is the same as or similar to service module 112, in accordance with one or more implementations.

At an operation 608, a list of content items may be provided to the one or more user-provided devices. For example, the provided list may include the first set of content items and the second set of content items. Operation 608 may be performed by a service module that is the same as or similar to service module 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for facilitating in-vehicle services for user-provided devices, wherein an individual user-provided device is provided and brought on by a user during transit on a vehicle, the method being implemented on an in-vehicle computer system that includes one or more physical processors executing computer program instructions which, when executed, perform the method, the method comprising:

facilitating, by the in-vehicle computer system, one or more communication sessions between the in-vehicle computer system and one or more user-provided devices; storing, by the in-vehicle computer system, content items available to the one or more user-provided devices;

identifying, by the in-vehicle computer system, one or more recommended content items, the one or more recommended content items being a subset of the content items available to the one or more user-provided devices;

providing, by the in-vehicle computer system, a list of the one or more recommended content items to a user-provided device of the one or more user-provided devices via the one or more communication sessions;

receiving, at the in-vehicle computer system, a selection of at least one recommended content item of the one or more recommended content items from the user-provided device; and providing, by the in-vehicle computer system via the one or more communication sessions, access to the selected content item to the user-provided device:

(1) in exchange for payment in accordance with a first set of costs responsive to an indication from the user-provided device to obtain the selected content item from the in-vehicle computer system without a connection to a third party content store; and (2) in exchange for payment in accordance with a second set of costs that is different from the first set of costs responsive to an indication to obtain the selected content item via a connection to the third party content store;

wherein providing the access to the selected content item comprises providing the access to the selected content item for persistent storage at the user-provided device such that the selected content item is accessible after the user is no longer in transit.

2. The method of claim 1, wherein providing the list of the one or more recommended content items comprises:

providing a list of a first set of content items stored at the in-vehicle computer system and available to the user-provided device without the in-vehicle computer system or the user provided device having to connect to a network external to the vehicle; and providing a list of a second set of content items for which related information is stored at the in-vehicle computer system but for which the in-vehicle computer system or the user provided device has to connect to a network external to the vehicle to obtain a content item of the second set of content items.

3. The method of claim 1, wherein the selected content item is not stored at the in-vehicle computer system at the time of the selection, the method further comprising:

obtaining, by the in-vehicle computer system, the selected content item from a third party content store responsive to the selection; and storing, at the in-vehicle computer system, the selected content item such that the selected content item is available to the one or more user-provided devices from the in-vehicle computer system without the in-vehicle computer system or the one or more user-provided devices having to connect to a network external to the vehicle for the one or more user-provided devices to obtain the selected content item.

4. The method of claim 1, wherein the list of the one or more recommended content items specifies a first set of content items and a second set of content items different from the first set of content items, the method further comprising:

providing, by the in-vehicle computer system, an indication that content items of the first set of content items are obtainable from the in-vehicle computer system without a connection to a network external to the vehicle, wherein the content items of the first set of content items are already stored at the in-vehicle computer system when the list is provided to the user-provided device; and providing, by the in-vehicle computer system, an indication that content items of the second set of content items are obtainable via a connection to a network external to the vehicle, wherein the content items of the second set of content items are not stored at the in-vehicle computer system when the list is provided to the user-provided device.

5. The method of claim 1, wherein the access to the selected content item is provided to the user-provided device based on a determination that the user is currently in transit.

6. The method of claim 1, the method further comprising:
determining, by the in-vehicle computer system, whether the user is currently in transit; and revoking, by the in-vehicle computer system, the access to the selected content item based on a determination that the user is no longer in transit.

7. The method of claim 1, the method further comprising:
communicating, by the in-vehicle computer system, with one or more computer systems that are external to the vehicle to determine content provisioning information associated with the content items stored at the in-vehicle computer system; and determining, by the in-vehicle computer system, whether to allow the user-provided device to stream the selected content item or download the selected content item, wherein providing the access to the selected content item comprises: (i) buffering content of the selected content item for transmission to the user-provided device responsive to a determination to allow the user-provided device to stream the selected content item; and (ii) transmitting a file that allows playback of the selected content item to the user-provided device responsive to a determination to allow the user-provided device to download the selected content item.

8. The method of claim 1, the method further comprising:
providing, by the in-vehicle computer system, information indicating a current location of the vehicle to the one or more user-provided devices; and providing, by the in-vehicle computer system, one or more of media content, an interactive display, or points of interest information to the one or more user-provided devices based on the current location.

9. The method of claim 1, wherein the vehicle is an airplane, wherein the in-vehicle computer system is a fixed computer system affixed within the airplane, and wherein the one or more user-provided devices comprise one or more passenger-operated wireless mobile devices programmed with computer program instructions for communicating with the fixed computer system and for performing other general wireless device functionalities.

10. An in-vehicle computer system for facilitating in-vehicle services for user-provided devices, wherein an individual user-provided device is provided and brought on by a user during transit on a vehicle, the in-vehicle computer system comprising:

one or more physical processors executing computer program instructions which, when executed, cause the in-vehicle computer system to:

facilitate one or more communication sessions between the in-vehicle computer system and one or more user-provided devices;

store content items available to the one or more user-provided devices;

identify one or more recommended content items, the one or more recommended content items being a subset of the content items available to the one or more user provided devices;

provide a list of the one or more recommended content items to a user-provided device of the one or more user-provided devices via the one or more communication sessions;

receive a selection of at least one recommended content item of the one or more recommended content items from the user-provided device; and provide, via the one or more communication sessions, access to the selected content item to the user-provided device:

(1) in exchange for payment in accordance with a first set of costs responsive to an indication from the user-provided device to obtain the selected content item from the in-vehicle computer system without a connection to a third party content store; and (2) in exchange for payment in accordance with a second set of costs that is different from the first set of costs responsive to an indication to obtain the selected content item via a connection to the third party content store;

wherein providing the access to the selected content item comprises providing the access to the selected content item for persistent storage at the user-provided device such that the selected content item is accessible after the user is no longer in transit.

11. The in-vehicle computer system of claim 10, wherein providing the list of the one or more recommended content items comprises:

providing a list of a first set of content items stored at the in-vehicle computer system and available to the user-provided device without the in-vehicle computer system or the user provided device having to connect to a network external to the vehicle; and providing a list of a second set of content items for which related information is stored at the in-vehicle computer system but for which the in-vehicle computer system or the user provided device has to connect to a network external to the vehicle to obtain a content item of the second set of content items.

12. The in-vehicle computer system of claim 10, wherein the selected content item is not stored at the in-vehicle computer system at the time of the selection, and wherein the in-vehicle computer system is caused to:

obtain the selected content item from a third party content store responsive to the selection; and store selected first content item such that the selected content item is available to the one or more user-provided devices from the in-vehicle computer system without the in-vehicle computer system or the one or more user-provided devices having to connect to a network external to the vehicle for the one or more user-provided devices to obtain the selected content item.

13. The in-vehicle computer system of claim 10, wherein the list of the one or more recommended content items specifies a first set of content items and a second set of content items different from the first set of content items, and wherein the in-vehicle computer system is caused to:

provide an indication that content items of the first set of content items are obtainable from the in-vehicle computer system without a connection to a network external to the vehicle, wherein the content items of the first set of content items are already stored at the in-vehicle computer system when the list is provided to the user-provided device;

and provide an indication that content items of the second set of content items are obtainable via a connection to a network external to the vehicle, wherein the content items of the second set of content items are not stored at the in-vehicle computer system when the list is provided to the user-provided device.

14. The in-vehicle computer system of claim 10, wherein the access to the selected content item is provided to the user-provided device based on a determination that the user is currently in transit.

15. The in-vehicle computer system of claim 10, wherein the in-vehicle computer system is caused to:

determine whether the user is currently in transit; and revoke the access to the selected content item based on a determination that the user is no longer in transit.

16. The in-vehicle computer system of claim 15, wherein the in-vehicle computer system is caused to:

communicate with one or more computer systems that are external to the vehicle to determine content provisioning information associated with the content items stored at the in-vehicle computer system; and determine whether to allow the user-provided device to stream the selected content item or download the selected content item, wherein providing the access to the selected content item comprises: (i) buffering content of the selected content item for transmission to the user-provided device responsive to a determination to allow the user-provided device to stream the selected content item; and (ii) transmitting a file that allows playback of the selected content item to the user-provided device responsive to a determination to allow the user-provided device to download the selected content item.

17. The in-vehicle computer system of claim 10, wherein the in-vehicle computer system is caused to:

provide information indicating a current location of the vehicle to the one or more user provided devices; and provide one or more of media content, an interactive display, or points of interest information to the one or more user-provided devices based on the current location.

18. The in-vehicle computer system of claim 10, wherein the vehicle is an airplane, wherein the in-vehicle computer system is a fixed computer system affixed within the airplane, and wherein the one or more user-provided devices comprise one or more passenger operated wireless mobile devices programmed with computer program instructions for communicating with the fixed computer system and for performing other general wireless device functionalities.

* * * * *